(12) United States Patent
Karem

(10) Patent No.: US 7,802,754 B2
(45) Date of Patent: Sep. 28, 2010

(54) TILT OUTBOARD WING FOR TILT ROTOR AIRCRAFT

(76) Inventor: Abe Karem, 1018 Timberline La., Tustin, CA (US) 92705

( * ) Notice: Subject to any disclaimer, the term of this patent is extended or adjusted under 35 U.S.C. 154(b) by 955 days.

(21) Appl. No.: 11/505,025

(22) Filed: Aug. 15, 2006

(65) Prior Publication Data

US 2009/0266942 A1    Oct. 29, 2009

Related U.S. Application Data

(60) Provisional application No. 60/708,646, filed on Aug. 15, 2005.

(51) Int. Cl.
B64C 27/28    (2006.01)
B64C 15/12    (2006.01)
B64C 3/50     (2006.01)

(52) U.S. Cl. ............... 244/7 C; 244/12.4; 244/213; 244/215

(58) Field of Classification Search ........... 244/7 R, 244/7 C, 56, 12.4
See application file for complete search history.

(56) References Cited

U.S. PATENT DOCUMENTS

| | | | |
|---|---|---|---|
| 3,181,810 A * | 5/1965 | Olson | 244/7 R |
| 3,332,643 A * | 7/1967 | Toner | 244/7 R |
| 3,586,262 A | 6/1971 | Sherman | |
| 3,655,149 A | 4/1972 | Williams | |
| 3,666,209 A * | 5/1972 | Taylor | 244/7 C |
| 5,096,140 A | 3/1992 | Dornier, Jr. et al. | |
| 5,236,149 A * | 8/1993 | MacKay | 244/7 C |
| 5,289,994 A * | 3/1994 | Del Campo Aguilera | 244/7 B |
| 5,405,105 A * | 4/1995 | Kress | 244/7 C |
| 5,509,623 A | 4/1996 | Schmittle | |
| 6,161,800 A * | 12/2000 | Liu et al. | 244/7 R |
| 6,367,736 B1 * | 4/2002 | Pancotti | 244/7 R |
| 6,607,161 B1 * | 8/2003 | Krysinski et al. | 244/7 A |
| 6,659,394 B1 * | 12/2003 | Shenk | 244/7 C |
| 6,783,096 B2 * | 8/2004 | Baldwin | 244/12.4 |
| 6,896,221 B1 * | 5/2005 | Einarsson | 244/7 C |
| 7,147,182 B1 * | 12/2006 | Flanigan | 244/6 |
| 7,584,923 B2 * | 9/2009 | Burrage | 244/7 R |
| 2005/0230519 A1 * | 10/2005 | Hurley | 244/7 C |

* cited by examiner

*Primary Examiner*—Tien Dinh
*Assistant Examiner*—Joseph W Sanderson
(74) *Attorney, Agent, or Firm*—Fish & Associates, PC

(57) ABSTRACT

Tilt-rotor aircraft experience increased efficiency and fuel economy by including wing extensions outboard of the tilting nacelles. Stall and buffeting during conversion from rotor-born hover to wing-born forward flight are reduced to an acceptable level using wide chord flaps deflected upwards by at least 15-20°, preferably in combination with leading edge slats. The outboard wing or wing portion preferably has a span at least 25-40% of a span of the inboard section, and a total surface area at least 10-20% the total surface area of the corresponding inboard section.

15 Claims, 3 Drawing Sheets

LE slat with TE flap, "low" drag @ α=50°
with greatly reduced flow separation

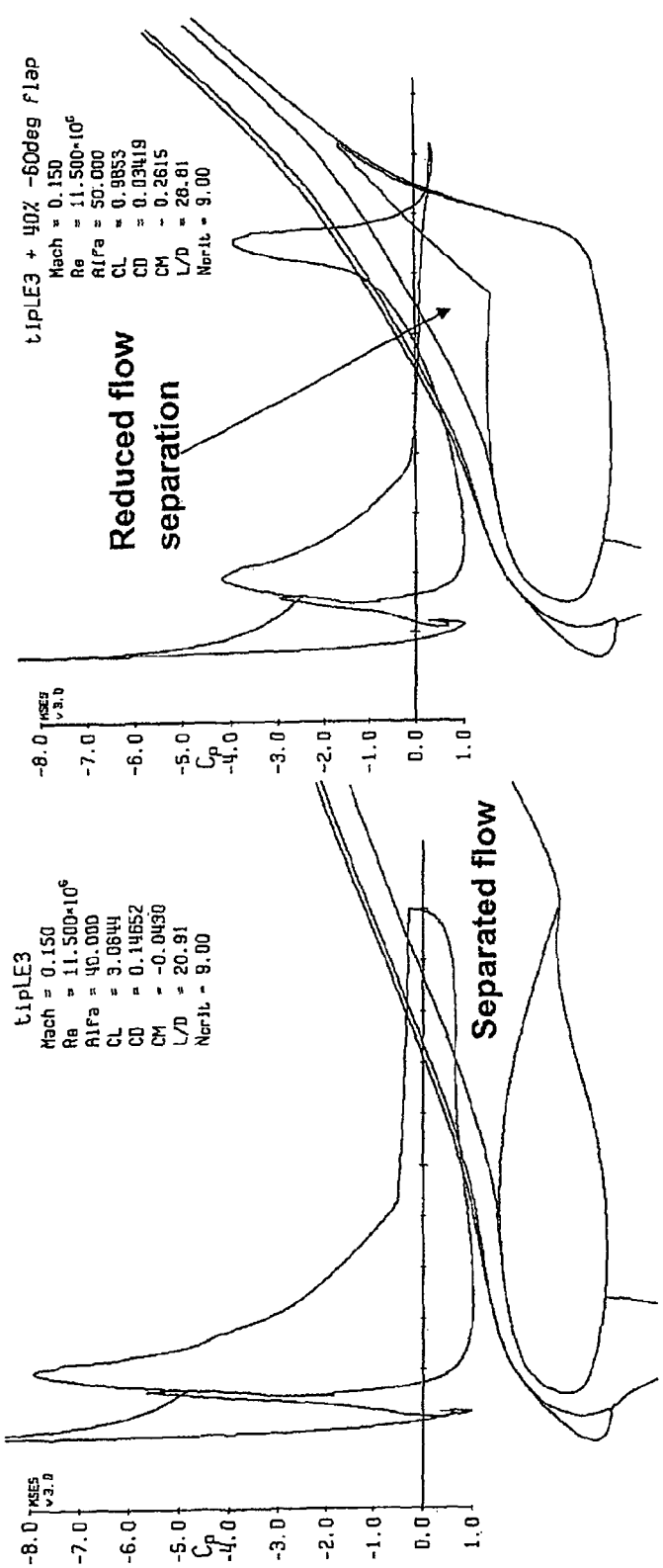
Fig. 3B — LE slat with TE flap, "low" drag @ α=50° with greatly reduced flow separation
Fig. 3A — LE slat w/o TE flap, high drag @ α=40° with extensive flow separation

TILT OUTBOARD WING FOR TILT ROTOR AIRCRAFT

This application claims priority to U.S. Provisional Application Ser. No. 60/708,646 filed Aug. 15, 2005.

FIELD OF THE INVENTION

The field of the invention is tilt-rotor aircraft.

BACKGROUND OF THE INVENTION

The successful development of the tilt-rotor aircraft in the last 30 years (Bell XV-15, Bell/Boeing V-22 and Bell/Agusta 609) make the tilt-rotor configuration a commercially viable starting point for efficient Vertical Take-Off and Landing (VTOL) aircraft.

Tilt-rotor aircraft are aircraft which use the lift of rotors to hover and VTOL. These aircraft tilt their rotors so that in forward flight the lift is provided by the wing and the forward thrust by the rotors. The term "proprotor" can also be used to describe rotors that function as a propulsive device in forward flight and as lifting device in helicopter mode.

The cruise efficiency of aircraft as measured by its payload carried times the distance traveled per consumed fuel (for example Lb of Payload×Mile traveled/Lb of consumed fuel) is proportional to the ratio between lift and drag of the aircraft in cruise.

The best (highest) lift/drag ratio of a fixed wing aircraft is strongly related to the ratio of wing span to the size of the aircraft. For example, competition gliders use very small and streamlined fuselage (for low drag) and large span wings for best lift/drag (glide ratio).

The flight speed for best lift/drag ratio, at given aircraft weight and altitude, is a function of wing area. An aircraft with smaller wing area will have higher speed for best lift/drag. The ratio of wing span to average wing chord is called wing aspect ratio. The combination of increasing glide ratio (larger span) and decreasing wing area (increasing speed) result in a strong drive to increase the wing aspect ratio (long and narrow wings). High wing aspect ratios are limited by structures, weight and structural dynamics considerations.

While high performance gliders use wing aspect ratio ranging from 20 to 38, the values for modern swept back wings of jet transports are 8-10 and for straight wings of propeller driven transports are 10-12. The use of high strength/weight carbon fiber composites makes higher aspect ratio wings more efficient in terms of aerodynamic performance vs. wing weight.

Prior art tilt-rotor aircraft have wing aspect ratio of 5.5 with the tilt-rotors, engines and nacelles placed at the wing tips. A particularly important consideration for such a low aspect ratio having a very stiff wing to avoid whirl flutter, which is an aero-elastic instability of the combination of wing and rotor. The wider chord wing of 5.5 aspect ratio causes a high downward in hover of 11-12% of rotor lift therefore requiring larger rotors, more powerful engines and higher torque gearboxes to overcome the increase in required rotor lift.

All current tilt-rotor aircraft have adopted the same sense of rotor rotation, top blade turning outward. This sense of rotation provides an interaction between the rotor and wing which is equivalent to approximately 10% increase in wing aspect ratio.

Tilt-wing aircraft (as opposed to tilt-rotor aircraft) use the lift of rotors or propellers to hover and VTOL with their wings pointed in the vertical position (leading edge up), and tilt their wings and rotors or propellers so that in forward flight the lift is provided by the wing and forward thrust by the rotors or propellers. An example of a tilt-wing aircraft is the LTV/Hiller/Ryan XC-142A. Among the disadvantages of tilt-wing aircraft is the high level of buffeting caused by the massive stall of the wing in forward flight with the wing and rotors at steep angle close to hover position. This maneuver is necessary for conversion from hover to forward flight at the minimum speed required to generate adequate lift on the wing to allow tilting the wing and rotor to normal airplane flight. Tilt-rotor aircraft don't have that disadvantage because they don't tilt the wing.

A remaining problem in tilt-rotor aircraft is that the low aspect ratio results in low lift/drag ratio, and consequently low aircraft efficiency and fuel economy. Thus, there is still a need for improvements to tilt-rotor aircraft that would improve lift/drag ratio, aircraft efficiency, and fuel economy

SUMMARY OF THE INVENTION

The present invention provides wing extensions outboard of the tilting rotor nacelles in tilt-rotor aircraft. The purpose of such extensions is to increase in wing span and wing aspect ratio, and thereby to increase the lift/drag ratio and the resulting aircraft efficiency and fuel economy. Extensive analysis with rotor analysis code (Wayne Johnson's CAMRAD II) indicates that in cruise mode the positive effects of the outboard wing and the rotor sense of rotation are additive, with little or no reduction in the positive contribution of either.

The wing extensions (for convenience—outboard wings) tilt with the rotor nacelle. This avoids the down load that would have acted on the outboard wing in hover, and therefore avoids the need to increase rotor size, engine power and gearbox torque to create the required additional lift.

The outboard wings act like any tilt-wing in the sense that they are prone to massive stall and severe buffeting during conversion from rotor-born hover to wing-born forward flight. That problem is resolved herein by combining the conventional leading edge slats with wide chord flaps deflected up in distinction from the down deflection used in tilt-wing aircraft. Wing stall is virtually eliminated using that combination, up to a very high angle of attack.

Interestingly, it appears that the prior art contains no teaching, suggestion or motivation to provide an aircraft with a tilting wing of any type, which has a trailing edge flap that deflects upwardly by at least 15°. In preferred embodiments such tilting wings have one or more of: a trailing edge flap that deflects upwardly by at least 20°, the upwardly deflecting flap comprises a flaperon; the tilting wing includes a wing portion outboard of a wing-mounted proprotor; tilting wing includes at least one slat, the flap is at least 30% of the wing chord, and the flap is at least 40% of the wing chord.

From a method perspective, flight performance of an aircraft with outboard wings can be improved by upwardly deflecting the trailing edge flap while transitioning between forward cruise flight and take-off and landing mode. As used herein, the term "take-off and landing mode" includes VTOL, STOL, and STOVL.

In another aspect, methods of reducing buffeting of an aircraft having a tilting wing comprise including a trailing edge wing flap on the wing, and upwardly deflecting the flap while transitioning between forward cruise flight and take-off and landing mode. In that respect it should be appreciated that the term "aircraft having tilting wing" is used interchangeably herein with a "tilt wing aircraft".

In still another aspect, methods of increasing lift to drag ratio of an aircraft having a tilting wing comprise including a trailing edge wing flap on the wing, and upwardly deflecting the flap while transitioning between forward cruise flight and take-off and landing mode.

In rotorcraft having a tilting proprotor, it is thus contemplated to design, manufacture, fit or retrofit the rotorcraft with a wing having a non-tilting section inboard of the proprotor, and a tiling section outboard of the proprotor. In such rotorcraft the outboard section preferably has a span at least 25% of a span of the inboard section, and more preferably at least 30%, at least 35%, and even at least 40% of a span of the inboard section. Alternatively or additionally, an outboard section of such rotorcraft can advantageously have a total surface area at least 10%, more preferably at least 12%, at least 16%, and even at least 20% of a total surface area of the corresponding inboard section. The outboard section preferably incorporates a trailing edge flap that deflects upwardly by at least 15°, and more preferably by at least 20°.

In such rotorcraft embodiments upward deflecting of the trailing edge flap can advantageously be used to: improve flight performance while transitioning between forward cruise flight and take-off and landing mode; reducing buffeting; and to increase the lift to drag ratio.

Various objects, features, aspects and advantages of the inventive subject matter will become more apparent from the following detailed description of preferred embodiments of the invention, along with the accompanying drawings in which like numerals represent like components.

BRIEF DESCRIPTION OF THE DRAWING

FIGS. 3A, 3B are charts presenting Computational Fluid Dynamics (CFD) results showing the effect of up-deflected flaperons on outboard wing flow separation.

DETAILED DESCRIPTION

Figure 1:
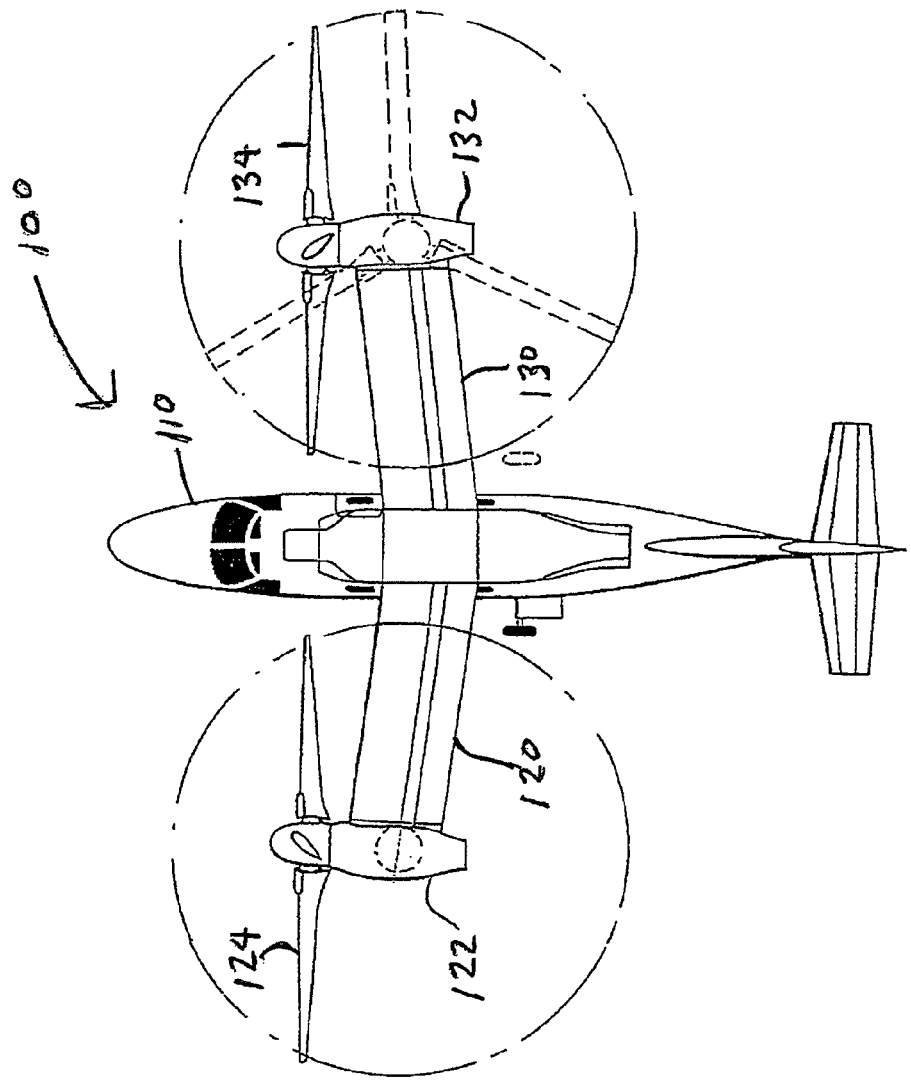
FIG. 1 is a prior art plan view of a modern twin tilt-rotor rotorcraft (Bell/Agusta BA 609).

In FIG. 1 a rotorcraft 100 generally includes a fuselage 110, a left wing 120 with tilting nacelle 122 and rotor 124, and a right wing 130 with tilting nacelle 132 and rotor 134. As with other prior art aircraft of this type, each of the wings 120, 130 has a wing aspect ratio is 5.5. To illustrate the tilt-rotor aspect of the design in a simplified manner, the nacelles 122, 132, and the right rotor 134 are shown in the lifting configuration in dashed lines.

It should be appreciated that although rotorcraft 100 is depicted here in a substantially to-scale model of a Bell/Agusta BA 609, the drawing should be interpreted as being representative of tilt-rotorcraft in general. In particular, it is contemplated that the inventive subject matter could also be applied to twin tilt-rotor, quad tilt-rotor configuration, etc.

Figure 2:
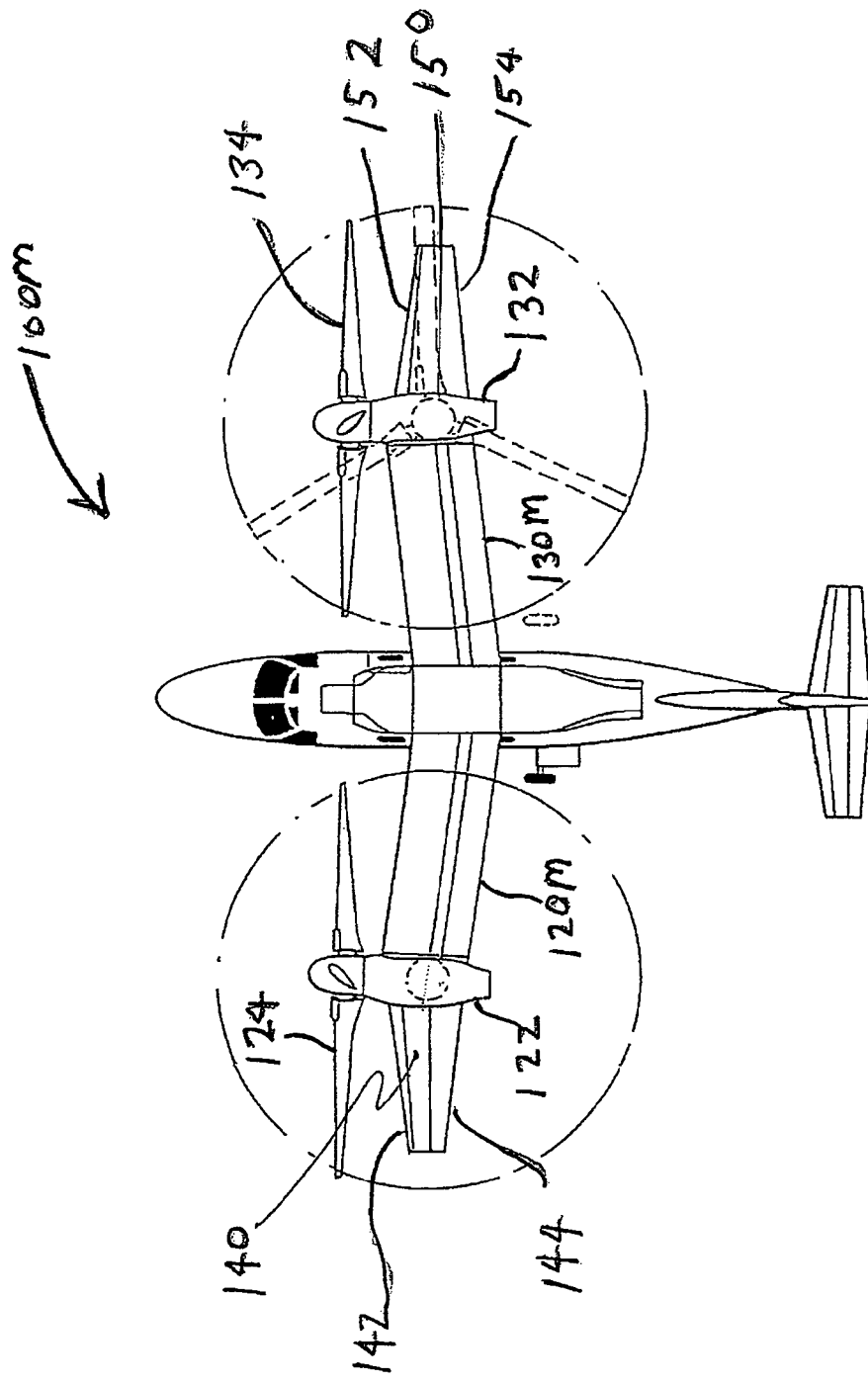
FIG. 2 is a plan view of a modern twin tilt-rotor rotorcraft (Bell/Agusta BA 609), modified in accordance with aspects of the inventive subject matter.

In FIG. 2 the rotorcraft 100M of FIG. 1 has been modified to include outboard wings 140, 150, which increase the wing aspect ratio (ratio of wing span to average wing chord) by 100% (5.5 to 11), and the wing area by 50%. This was achieved by the addition of wing surfaces outboard of the rotor nacelles (outboard wings) to increase the span by 73%. The "M" designation is used to reflect the fact that the aircraft is similar in most respects, but is modified to implement the inventive concepts described herein.

An interesting feature of FIG. 2 is that the wing aspect ratio has been doubled while maintaining the same wing area, and same wing airfoils and flap configuration. By maintaining the same wing area, airfoil, and flap configuration, the wing lift during maneuver from airplane mode to helicopter mode is maintained, and this critical maneuver stays the same as in the basic rotorcraft standard design. That achievement, however, is not absolutely critical, and it is contemplated that outboard wings could be used while concomitantly modifying one or more of the wing area, airfoil, and flap configuration. As used herein, the term "flap" includes flaperons.

The outboard wings 140, 150 preferably incorporate both controllable conventional leading edge slotted flaps (slats) 142, 152 and controllable trailing edge flaperons (combination of ailerons and flaps) 144, 154. This is important because the outboard wings 140, 150 are attached to, and tilt with, the respective left and right rotor nacelles 122, 132, and therefore will be subject to some of the same aerodynamic disadvantages of other tilt-wing aircraft such as the XC-142A. In order to avoid the high level of buffeting caused by the massive stall of the outer wings during conversion between airplane mode and helicopter mode, the current invention provides for the use of upward deflected flaperons 144, 154, in combination with conventional slats 142, 152.

Modified rotorcraft 100M also has new designations for the wings, 120M, 130M, which designations indicate that the wings can also have flaps that can be deflected upwardly by at least 15-20°.

Contemplated wing extensions can be of any suitable size and/or shape. Total top surface area of such extensions is preferably at least 10%, more preferably at least 20%, and most preferably at least 30% of the total top surface area of the wing inboard of the rotor nacelle. Viewed from another aspect, the increase in wing span with the outboard wings is preferably at least 25%, more preferably at least 40% and most preferably at least 55% as compared to the span of the wing inboard of the rotor nacelle.

One preferred shape for the outboard wings is tapered with the tip chord ranging from 0.2-0.5 of the chord outboard of the rotor nacelle. The combination of outboard wing positioning in the forward-aft direction and outboard wing sweep may be used to minimize the pitch control moment of the outboard wing-nacelle-rotor assembly thereby reducing the loads on the tilt actuators. Another preferred shape is of elliptical planform.

FIGS. 3A, 3B presents Computational Fluid Dynamics (CFD) results showing the drastic reduction in buffet causing flow separation and in drag achieved with the up deflected large chord flaperons (40% of wing chord) as compared to the wing with slat only. While the slat-only shows massive flow separation and drag coefficient of 0.146 at an angle of attack of 40°, the wing with slats and flaperons deflected up shows drastically reduced flow separation and 77% reduction in drag even at 50° angle of attack. The described use of up deflected flaperons substantially solves the buffet and drag problem of the tilt outboard wings, especially if the fact the total area of the outboard wings is only 22% of the total wing area as modified per the current invention is taken in consideration. In short, large negatively defected flaps drastically reduce lift, drag and flow separation for tilt-tip at $\alpha > 40°$.

As will be appreciated by those skilled in the art, the abbreviations are as follows: Mach=ratio of aircraft speed to speed of sound in air; Ra=function of dynamic viscosity; Alpha=angle of attack; CL=Coefficient of Lift; CD=Coefficient of Drag; CM=Coefficient of Pitch Moment; L/D=Load/Drag ratio; Norit=function of smoothness of the surface.

By increasing the wing span, area and aspect ratio at the above stated values, the current invention provides the following estimated benefits due to improved aerodynamic efficiency:

50% decrease in drag due to lift (induced drag in the aerospace vernacular) in cruise flight in airplane mode; this usually translates to 25% reduction in drag at cruise speed for best economy.

25% reduction in rotor power required for economical cruise at a given rotorcraft weight (longer rotor, engine and gearbox lives).

25% increase in cruise fuel economy.

25% increase in range.

Substantial increase in cruise altitude for better weather avoidance (requires increase in cabin pressurization).

Over 50% increase in maximum sustained maneuver (without loss of altitude or speed) at given weight and altitude.

50% increase in maximum wing lift at given speed and altitude, which provides:

50% higher instantaneous maneuver capability at given weight and altitude.

33% lower stall speed at given weight and altitude.

Substantially wider "corridor" of conversion maneuvers from airplane mode to helicopter mode which increases safety in this critical flight phase.

30% increase in maximum weight in short roll take-off mode or 33% reduction in required take-off and landing runway length for given weight.

The tilt-rotor aircraft modified per the present invention will have higher empty weight than the basic aircraft, due to the additional outboard wings and the need for heavier structure to carry the higher wing bending loads, the higher level of cabin pressurization and possibly the higher short rolling take-off and landing weights.

The tilt-rotor aircraft modified per the present invention can have approximately 2-15% higher drag at zero lift, due to the additional drag of the outboard wings, and therefore could have had a slightly lower maximum speed at low altitude than the basic aircraft. Analysis shows that the increase in lift/drag ratio (40-50% at best cruise speed, lower percentage at high speed at low altitude), due to the reduction in induced drag, results in the maximum speed increasing, with the current invention, at all altitudes.

Thus, specific embodiments, applications, and methods have been disclosed in which tilt-rotor aircraft have outboard wings. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. An improved method of transitioning between a forward cruise flight mode and a take-off and landing mode in a rotorcraft having a port wing and a starboard wing, each wing having an inboard section and a tilting outboard section disposed outboard of the inboard section, each outboard section having a leading edge slat and a trailing edge flap, the improvement comprising:

deflecting the trailing edge flaps on the outboard sections together in an upward direction such that the flaps are deflected during transition from take-off and landing mode and forward flight relative to the leading edge slats; and then moving into the forward cruise flight mode.

2. The method of claim 1, wherein the step of deflecting the flaps comprise deflecting the flaps so that at a given moment in time they are each deflected upwardly by at least 20°.

3. The method of claim 1 wherein the flaps are flaperons.

4. The method of claim 1 wherein the rotorcraft is a tilting proprotor aircraft.

5. The method of claim 1 wherein each of the tilting outboard sections include at least one slat.

6. The method of claim 1 wherein each of the flaps composes at least 30% of its respective wing chord.

7. The method of claim 1 wherein each of the flaps comprises a flaperon, and each of the flaps composes at least 40% of its respective wing chord.

8. The method of claim 1, further comprising using a controller to control symmetric deflection of the flaps for the purpose of reducing drag while transitioning into the forward flight mode.

9. The method of claim 1, further comprising using a controller to control symmetric deflection of the flaps for the purpose of reducing buffeting while transitioning into the forward flight mode.

10. The method of claim 1, further comprising using a controller to control deflection of the flaps for the purpose of increasing a lift to drag ratio while transitioning into the forward flight mode.

11. The method of claim 1, wherein the inboard sections are non-tilting.

12. The method of claim 1, wherein each of the outboard sections has a span at least 25% of a span of its respective inboard section.

13. The method of claim 1, wherein each of the outboard sections has a span at least 40% of a span of its respective inboard section.

14. The method of claim 1, wherein each of the outboard sections has a total surface area at least 10% of a total surface area of its respective inboard section.

15. The method of claim 1, wherein each of the outboard section has a total surface area at least 20% of a total surface area of its respective inboard section.

* * * * *